US012188262B2

(12) United States Patent
Tinker

(10) Patent No.: US 12,188,262 B2
(45) Date of Patent: Jan. 7, 2025

(54) LOCK ASSEMBLY FOR NON-PIVOTABLE DOOR

(71) Applicant: Covet Security Alarm & Audio, LLC, Fenton, MI (US)

(72) Inventor: Matthew Tinker, Fenton, MI (US)

(73) Assignee: Covet Security Alarm & Audio, LLC, Fenton, MI (US)

(*) Notice: Subject to any disclaimer, the term of this patent is extended or adjusted under 35 U.S.C. 154(b) by 71 days.

(21) Appl. No.: 18/095,230

(22) Filed: Jan. 10, 2023

(65) Prior Publication Data

US 2023/0160234 A1 May 25, 2023

Related U.S. Application Data

(63) Continuation of application No. 16/815,165, filed on Mar. 11, 2020, now Pat. No. 11,578,507.

(51) Int. Cl.

| | |
|---|---|
| ***E05B 47/00*** | (2006.01) |
| ***E05B 9/00*** | (2006.01) |
| ***E05B 9/02*** | (2006.01) |
| ***E05B 15/02*** | (2006.01) |
| ***E05B 15/16*** | (2006.01) |
| ***E05B 65/08*** | (2006.01) |
| ***G07C 9/00*** | (2020.01) |

(52) U.S. Cl.

CPC .......... *E05B 47/0046* (2013.01); *E05B 9/002* (2013.01); *E05B 9/02* (2013.01); *E05B 15/0205* (2013.01); *E05B 15/16* (2013.01); *E05B 47/0001* (2013.01); *E05B 65/0864* (2013.01); *G07C 9/00182* (2013.01); *E05Y 2900/132* (2013.01); *G07C 2009/0019* (2013.01)

(58) Field of Classification Search

CPC ...... E05B 47/00; E05B 47/0046; E05B 9/002; E05B 9/02; E05B 47/0001; E05B 15/0205; E05B 15/16; E05B 65/0864; E05Y 2900/132; G07C 9/00182; G07C 2009/0019; Y10T 292/34; Y10T 292/37; Y10T 70/5173

USPC ............................................................ 70/277

See application file for complete search history.

(56) References Cited

U.S. PATENT DOCUMENTS 4,514,996 A * 5/1985 Sjogren ..................... E05C 1/04 292/147
5,682,775 A * 11/1997 Baber ................... E05C 19/184 70/99

(Continued)

*Primary Examiner* — Suzanne L Barrett
(74) *Attorney, Agent, or Firm* — Varnum LLP

(57) ABSTRACT

A locking assembly for a non-pivotable door is provided. The locking assembly comprises a spacer plate defining a spacer plate bolt void and a strike plate defining a strike plate bolt void. The spacer plate and strike plate are to be coupled to one another and further fixedly coupled to the non-pivotable door, such that the spacer plate bolt void and the strike plate bolt void are aligned. The locking assembly further comprises a locking mechanism and a housing, which is configured to receive and contain the locking mechanism. The locking mechanism comprises a latch bolt that is moveable between a retracted position within the housing and a deployed position. In the deployed position, the latch bolt extends outwardly from the housing and into each of the spacer plate bolt void and the strike plate bolt void, thereby locking the non-pivotable door to the housing.

19 Claims, 5 Drawing Sheets

(56) References Cited

U.S. PATENT DOCUMENTS

| | | | | | |
|---|---|---|---|---|---|
| 6,126,211 | A * | 10/2000 | Dominquez | E05B 65/0864 | 292/DIG. 46 |
| 8,284,023 | B2 * | 10/2012 | Coutermarsh | E05B 47/026 | 70/277 |
| 8,752,870 | B2 * | 6/2014 | Wolf | E05C 17/20 | 292/259 R |
| 11,578,507 | B2 * | 2/2023 | Tinker | E05B 15/16 | |
| 2003/0015879 | A1 * | 1/2003 | Finkelstein | E05B 65/0811 | 292/213 |
| 2019/0292836 | A1 * | 9/2019 | Demele | E05B 65/0888 | |

* cited by examiner

LOCK ASSEMBLY FOR NON-PIVOTABLE DOOR

CROSS REFERENCE TO RELATED APPLICATIONS

This application is a continuation of and claims the benefit of U.S. Non-Provisional patent application Ser. No. 16/815,165 filed on Mar. 11, 2020, which is hereby incorporated by reference in its entirety.

TECHNICAL FIELD

The disclosure relates to mechanisms for securing closure panels at points of ingress and egress. More particularly, the disclosure relates to lock assemblies for non-pivotable doors.

BACKGROUND

Door lock and latch assemblies are generally known in the art for use in latching and locking doors. Deadbolt locks are commonly and widely used in residential homes, apartments, commercial buildings, and other settings where it is desired to secure an entry against unwanted intrusion. Deadbolt locks are used in some instances as the sole means to lock an entry door, and in other instances in conjunction with other locking mechanisms. Latch and lock assemblies, including deadbolt locks, typically include one or more latch members mounted along a free side edge of a pivotable door and adapted to engage with associated keeper devices mounted on an adjacent doorjamb.

SUMMARY

A lock assembly for a non-pivotable door is provided. The lock assembly comprises a housing configured to receive a locking mechanism. The housing comprises a first face, a second face, a first side, a second side, and a housing interior positioned therebetween. The housing further defines an interior void space and a first plurality of bores.

The interior void space being defined by a first lateral end, a second lateral end, and a rear wall. The interior void space extends laterally between the first lateral end and the second lateral end and further extends into the housing interior from the first face to the rear wall.

Each bore of the first plurality of bores is configured to receive one of a plurality of fastening features that fastens the housing to a fixed substrate, such as a wall or floor. The first plurality of bores comprises at least a first bore positioned laterally between the first side of the housing and the first lateral end of the interior void space and a second bore positioned laterally between the second lateral end of the interior void space and the second side of the housing. The first bore and the second bore are positioned longitudinally between the rear wall of the interior void space and the second face of the housing.

The lock assembly further comprises a spacer plate defining a spacer plate bolt void and a strike plate defining a strike plate bolt void. The spacer plate and strike plate are configured to be coupled to one another, such that the spacer plate bolt void and the strike plate bolt void are aligned. The spacer plate and strike plate are further fixedly coupled to the non-pivotable door.

The housing is configured to receive a locking mechanism within the interior void space. The locking mechanism may be a deadbolt-style locking mechanism, such that the locking mechanism comprises a latch bolt that is moveable between a retracted position within the housing and a deployed position. In the deployed position the latch bolt extends outwardly from the housing and into each of the spacer plate bolt void and the strike plate bolt void, thereby locking the non-pivotable door to the housing.

DETAILED DESCRIPTION

Figure 1:
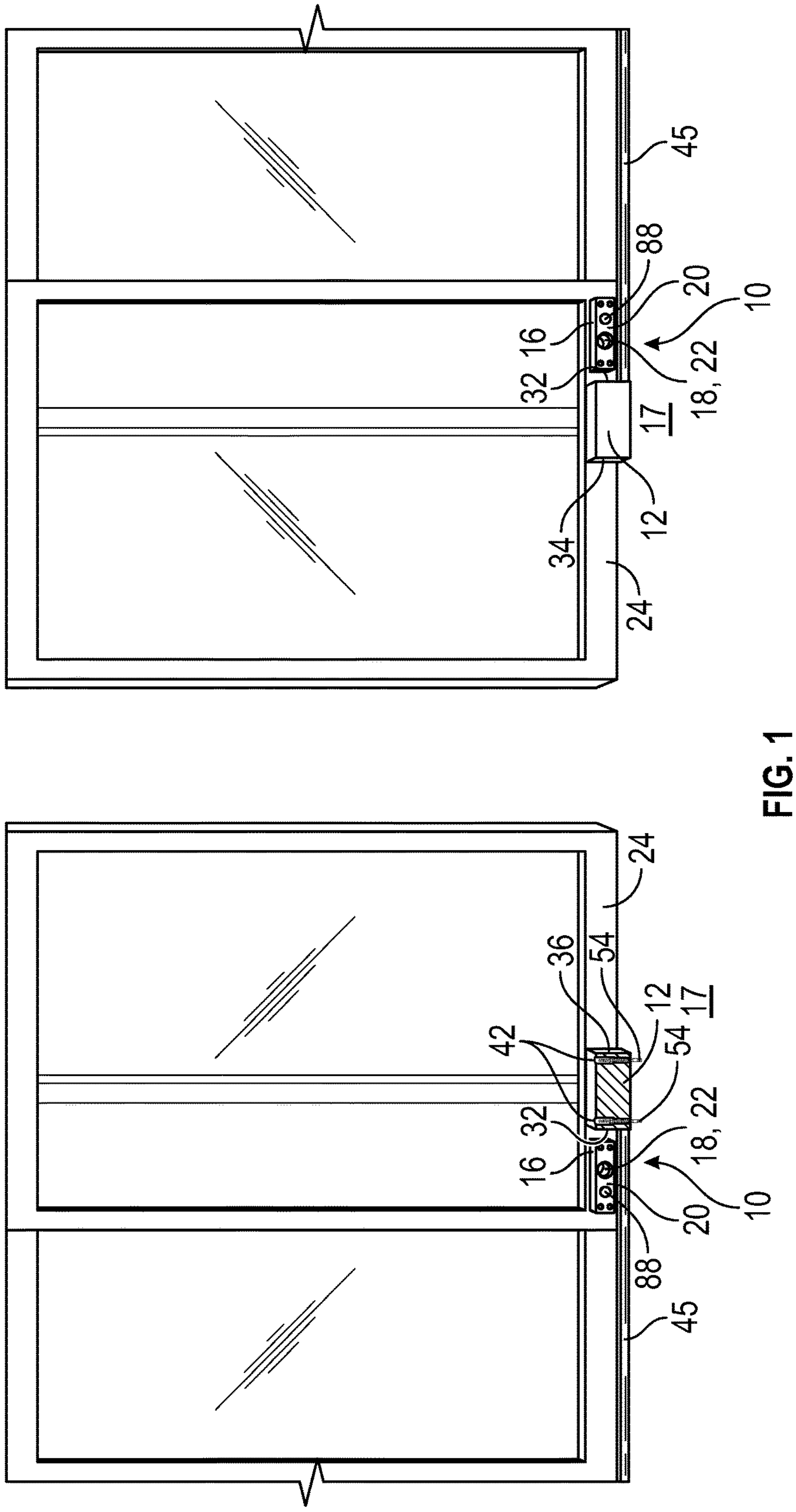
FIG. 1 is a schematic elevation view of the lock assembly employed on double sliding doors, wherein the doors are in a first position, such that the doors are at least partially ajar.

While the present disclosure may be described with respect to specific applications or industries, those skilled in the art will recognize the broader applicability of the disclosure. Those having ordinary skill in the art will recognize that terms such as “above”, “below”, “upward”, “downward”, etc., are used descriptively of the figures, and do not represent limitations on the scope of the disclosure, as defined by the appended claims. Any numerical designations, such as “first” or “second” are illustrative only and are not intended to limit the scope of the disclosure in any way.

The terms “comprising”, “including”, and “having” are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term “or” includes any one and all combinations of the associated listed items. The term “any of is understood to include any possible combination of referenced items, including “any one of the referenced items. The term “any of is understood to include any possible combination of referenced claims of the appended claims, including “any one of the referenced claims.

The terms “a”, “an”, “the”, “at least one”, and “one or more” are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

The following discussion and accompanying figures disclose configurations of lock assemblies with housings, wherein the lock assembly 10 is used on a non-pivotable door 24. Although the lock assembly 10 is depicted as a lock assembly 10 for a commercial single sliding door (FIGS. 6A and 6B) and/or commercial double sliding doors (FIGS. 1-2), in the associated Figures, concepts associated with the configurations and methods may be applied to various types of doors, such as commercial single sliding doors, commercial double sliding doors, cannon ball doors, residential sliding doors, and overhead doors, such as garage doors. Although the locking mechanism 14 is depicted as an electrified deadbolt lock, in the associated Figures, concepts associated with the configurations and methods may be applied to various types of locking mechanisms 14, which may also incorporate concepts discussed herein.

Figure 3A:
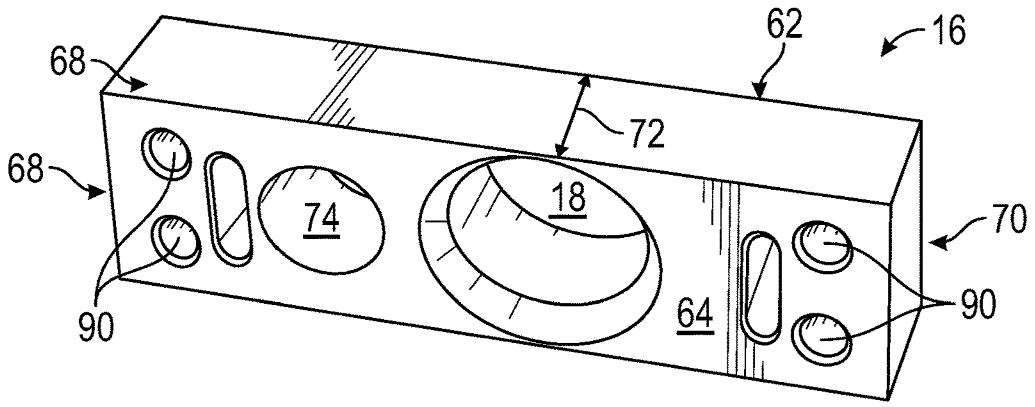
FIG. 3A is a schematic perspective view of an example spacer plate.

Referring to the drawings, wherein like reference numerals refer to like components throughout the several views, a lock assembly 10 is provided. In a general sense, the lock assembly 10 of the present disclosure includes a housing 12 permanently attached to a fixed substrate 17, such as a wall or floor, a spacer plate 16 (FIG. 3A-3B) defining a spacer plate bolt void 18, and a strike plate 20 (FIG. 3A-3B) defining a strike plate bolt void 22. The spacer plate 16 and the strike plate 20 are configured to be coupled to one another and further coupled to the non-pivotable door 24, such that the spacer plate bolt void 18 and the strike plate bolt void 22 are aligned. The housing 12 is configured to receive and contain a locking mechanism 14. The locking mechanism 14 may be a deadbolt-style locking mechanism, such that the locking mechanism 14 comprises a latch bolt 94 that is moveable between a retracted position 100 (FIG. 6A) within the housing 12 and a deployed position 200 (FIG. 6B). In the deployed position 200 the latch bolt 94 extends outwardly from the housing 12 and into each of the spacer plate bolt void 18 and the strike plate bolt void 22, thereby locking the non-pivotable door 24 to the housing 12.

Figure 4A:
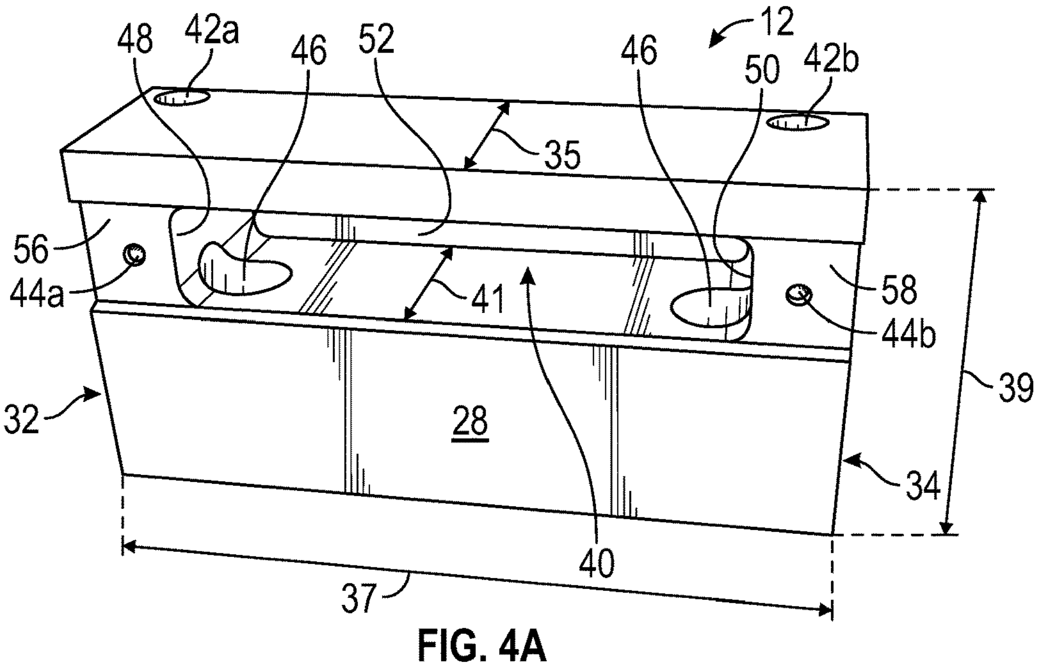
FIG. 4A is a first schematic perspective view of an example housing of the lock assembly.
Figure 4B:
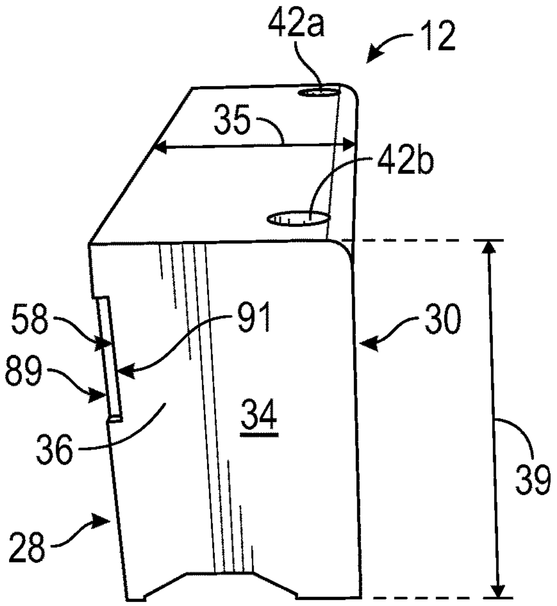
FIG. 4B is a second schematic perspective view of an example housing of the lock assembly.

Referring to FIGS. 4A and 4B, the locking assembly 10 includes a housing 12. The housing 12 may be formed of a metallic material, a polymeric material, or another suitable material. The housing 12 may be further formed by machining or casting. In one example, the housing 12 comprises a metallic material. The metallic material may be an aluminum-based material. The metallic material may be a steel-based material or a steel alloy material. The polymeric material may be, for example, a thermoset polymer, a thermoplastic polymer, or a polymer-based composite material.

The housing 12 may comprise a first face 28, a second face 30, a first side 32, a second side 34, and a housing interior 36 having a housing thickness 35 positioned therebetween. The housing 12 may have a width 37 of from about 8.0 inches to about 9.0 inches, a thickness 35 of from about 2.0 inches to about 4.0 inches, and a height 39 of from about 3.0 inches to about 4.0 inches.

Figure 5:
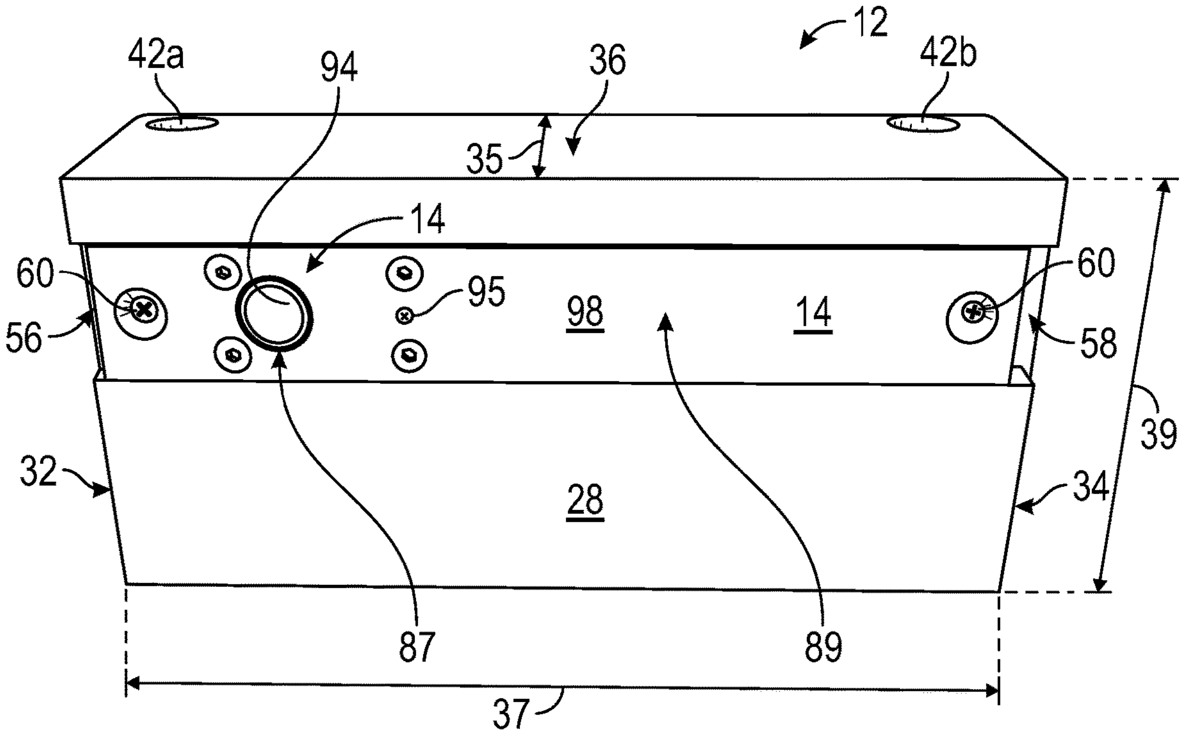
FIG. 5 is a schematic perspective view of an example housing of the lock assembly with a locking mechanism disposed within the housing.

The housing 12 defines an interior void space 40, a first plurality of bores 42, a second plurality of bores 44, and a third plurality of bores 46. As shown in FIG. 4A, the interior void space 40 is defined by a first lateral end 48, a second lateral end 50, and a rear wall 52, such that the interior void space 40 extends laterally between the first lateral end 48 and the second lateral end 50 and further extends into the housing interior 36 by a depth 41 measured from the first face 28 to the rear wall 52. More particularly, the depth 41 of the interior void space 40 is from about 1.5 inches to about 1.75 inches, in that the rear wall 52 is spaced apart from the first face 28 by the depth 41. As shown in FIG. 5, the housing 12 is configured to receive the locking mechanism 14 within the interior void space 40.

Referring back to FIGS. 4A-4B, the first plurality of bores 42 are formed in the housing interior 36 and extend vertically through the housing 12. In one example, the first plurality of bores 42 comprises a first bore 42*a* and a second bore 42*b*. The first bore 42*a* is positioned laterally between the first side 32 and the first lateral end 48. More particularly, the center and/or central axis of the first bore 42*a* may be disposed about 0.375 inches from the first side 32. The second bore 42*b* is positioned laterally between the second lateral end 50 and the second side 34. More particularly, the center and/or central axis of the second bore 42*b* may be disposed about 0.375 inches from the second side 34. The center of the first bore 42*a* and the center of the second bore 42*b* may be laterally spaced apart by about 7.25 inches.

Each of the bores of the first plurality of bores 42, including the first bore 42*a* and the second bore 42*b*, are positioned longitudinally between the rear wall 52 and the second face 30. More particularly, the center and/or central axis of the first bore 42*a* and the center and/or central axis of the second bore 42*b* are each positioned longitudinally, from about 0.50 inches to about 0.60 inches from the second face 30 and may be preferably spaced apart by about 0.55 inches. Further, each bore of the first plurality of bores 42 is configured to receive a fastening feature 54 that fastens the housing 12 to a fixed substrate 17, adjacent to the non-pivotal door 24. The fixed substrate 17 may be a floor in sliding door applications or a wall in overhead door applications. In one example, the fastening features may comprise a combination of nuts, bolts, and washers or nuts, screws, and washers. The fastening features may have an overall diameter of from about 0.625 inches to about 0.75 inches.

Referring again to FIGS. 4A and 4B, the housing 12 further comprises a third face 56 and a fourth face 58. The third face 56 is laterally positioned between the first side 32 and the first lateral end 48 and longitudinally positioned between the first face 28 and the rear wall 52 of the interior void space 40. The fourth face 58 is laterally positioned between the second side 34 and the second lateral end 50 and longitudinally positioned between the first face 28 and the rear wall 52 of the interior void space 40. Said another way, the third face 56 and the fourth face 58 are laterally spaced apart by the interior void space 40.

Referring still to FIGS. 4A and 4B, the housing 12 further defines a second plurality of bores 44. The second plurality of bores 44 are positioned on the third face 56 and the fourth face 58 and extends into the housing interior 36 toward the second face 30. In one example, the second plurality of bores 44 includes a first bore 44*a* and a second bore 44*b*. The first bore 44*a* is positioned on the third face 56 and extends into the housing interior 36 toward the second face 30. The second bore 44*b* positioned on the fourth face 58 and extends into the housing interior 36 toward the second face 30. The center and/or central axis of the first bore 44*a* and the center and/or central axis of the second bore 44*b* may be laterally spaced apart by from about 7.0 inches to about 7.25 inches and may be preferably laterally spaced apart by about 7.10 inches. Each of the second plurality of bores 44 is configured to receive a securing feature 60 that secures the locking mechanism 14 to the housing 12 within the interior void space 40. The housing 12 may further define a third plurality of bores 46 that extend between the interior void space 40 and the fixed substrate 17.

As shown in FIGS. 1-3A, the locking assembly 10 may further include a spacer plate 16. The spacer plate 16 may have a first spacer plate surface 62, a second spacer plate surface 64, a first lateral spacer plate side 68, a second lateral spacer plate side 70. The spacer plate 16 may have a width disposed between the first lateral spacer plate side 68 and the second lateral spacer plate side 70, and the width may be from about 3.50 inches to about 3.60 inches. The spacer plate 16 may further have a predetermined spacer plate thickness 72 between the first spacer plate surface 62 and the second spacer plate surface 64. The spacer plate thickness 72 may be from about 0.70 inches to about 0.80 inches and may be preferably about 0.75 inches.

The spacer plate 16 may define a spacer plate bolt void 18. The spacer plate bolt void 18 may have a depth, that extends from the first spacer plate surface 62 and into the spacer plate thickness 72, of from about 0.60 to about 0.75 inches, such that in some examples the spacer plate bolt void 18 extends through an entirety of the predetermined spacer plate thickness 72 between the first spacer plate surface 62 and the second spacer plate surface 64, and in other example the spacer plate bolt void 18 extends through less than an entirety of the spacer plate thickness 72. The center and/or central axis of the spacer plate bolt void 18 may be laterally disposed from about 1.80 inches to about 2.10 inches from the second lateral spacer plate side 70.

The spacer plate 16 may further define a spacer plate magnet cavity 74. The spacer plate magnet cavity 74 may have a depth, that extends from the first spacer plate surface 62 and into the spacer plate thickness 72, of from about 0.20 inches to about 0.75 inches, such that in some examples the spacer plate magnet cavity 74 that extends through the entirety of the predetermined spacer plate thickness 72 between the first spacer plate surface 62 and the second spacer plate surface 64, and in other example the spacer plate magnet cavity 74 extends through less than an entirety of the predetermined spacer plate thickness 72. In one example, the spacer plate magnet cavity 74 has a depth of about 0.25 inches. The spacer plate magnet cavity 74 may be laterally disposed between the spacer plate bolt void 18 and the first lateral spacer plate side 68, and more particularly, may be laterally disposed about 1.0 inches from the first lateral spacer plate side 68.

The spacer plate 16 may further define a plurality of spacer plate attachment bores 90 that extend through the entirety of the predetermined spacer plate thickness 72 between the first spacer plate surface 62 and the second spacer plate surface 64. At least one of spacer plate attachment bores 90 is disposed between the first lateral spacer plate side 68 and the spacer plate magnet cavity 74, and more particularly the center and/or central axis of the respective attachment bore is from about 0.25 inches to about 0.30 inches from the first lateral spacer plate side 68. At least another one of the spacer plate attachment bores 90 is disposed between the second lateral spacer plate side 70 and the spacer plate bolt void 18, and more particularly, the center and/or central axis of the respective attachment bore is from about 0.25 inches to about 0.30 inches from the first lateral spacer plate side 68.

Figure 2:
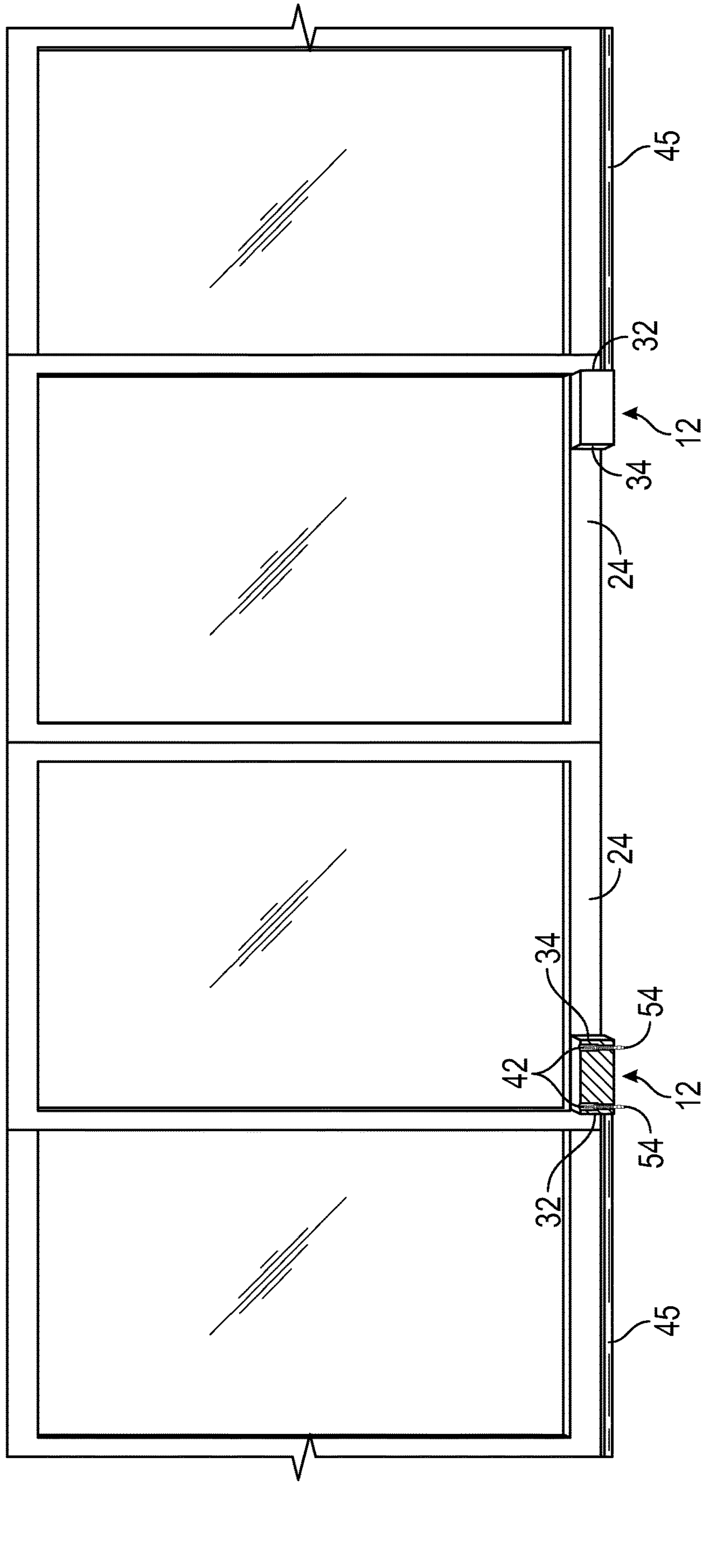
FIG. 2 is a schematic elevation view of the lock assembly employed on double sliding doors, wherein the doors are in a second position, such that the doors are secured and locked.
Figure 3B:
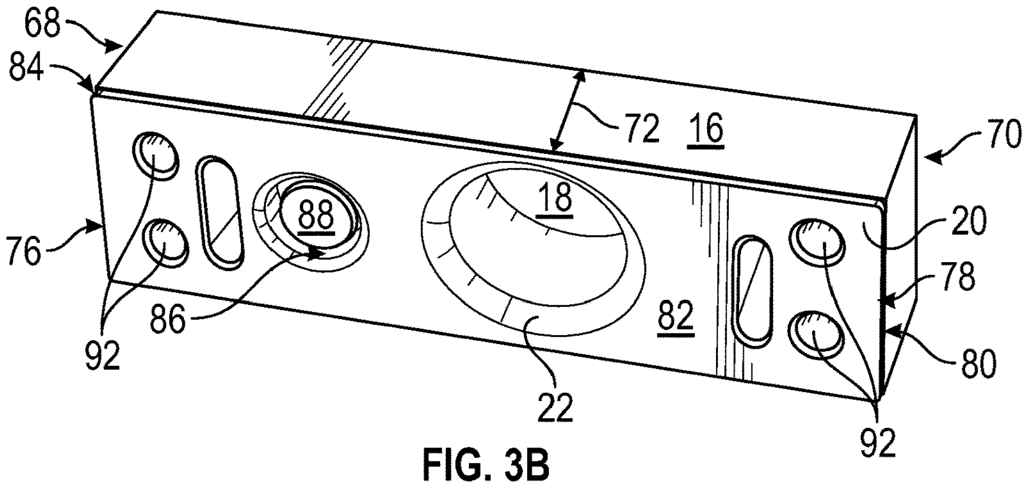
FIG. 3B is a schematic perspective view of the example spacer plate of FIG. 3A coupled with an example strike plate.

Referring to FIGS. 1-2 and 3B, the locking assembly 10 may further comprise a strike plate 20. The strike plate 20 may have a first lateral strike plate side 76, a second lateral strike plate side 78, first strike plate surface 80, a second strike plate surface 82. The strike plate 20 may have a width disposed between the first lateral strike plate side 76 and the second lateral strike plate side 78, and the width may be from about 3.50 inches to about 3.60 inches. The strike plate 20 may further have a predetermined strike plate thickness 84 between the first strike plate surface 80 and the second strike plate surface 82. The strike plate 20 may define a strike plate bolt void 22 and a strike plate magnet cavity 86. The strike plate bolt void 22 extends through an entirety of the predetermined strike plate thickness 84 between the first strike plate surface 80 and the second strike plate surface 82. The center and/or central axis of the strike plate bolt void 22 may be laterally disposed from about 1.80 inches to about 2.10 inches from the second lateral strike plate side 78.

The strike plate magnet cavity 86 extends through the entirety of the predetermined strike plate thickness 84 between the first strike plate surface 80 and the second strike plate surface 82. The strike plate magnet cavity 86 is further disposed between the first lateral strike plate side 76 and the strike plate bolt void 22, and more particularly the center and/or central axis of the strike plate magnet cavity 86 may be laterally disposed about 1.0 inches from the first lateral strike plate side 76. The strike plate magnet cavity 86 and the spacer plate magnet cavity 74 are configured to receive a magnet 88 therein, such that the magnet 88 disposed and/or seated within the strike plate magnet cavity 86 as shown in FIG. 3B.

The strike plate 20 may further define a plurality of strike plate attachment bores 92 that extend through the entirety of the predetermined strike plate thickness 84 between the first strike plate surface 80 and the second strike plate surface 82. At least one of the strike plate attachment bores 92 is disposed between the first lateral strike plate side 76 and the strike plate magnet cavity 86, and more particularly the center and/or central axis of the respective attachment bore is from about 0.25 inches to about 0.30 inches from the first lateral strike plate side 76. At least another one of the strike plate attachment bores 92 is disposed between the second lateral strike plate side 78 and the strike plate bolt void 22, and more particularly the center and/or central axis of the respective attachment bore is from about 0.25 inches to about 0.30 inches from the second lateral strike plate side 78.

As shown in FIGS. 1, 2, and 3B, the strike plate 20 and the spacer plate 16 are configured to be coupled to each other, and collectively coupled to the non-pivotable door 24. In this way, the first strike plate surface 80 is disposed adjacent to and in contact with the second spacer plate surface 64, such that the spacer plate bolt void 18 is aligned with the strike plate bolt void 22 and the spacer plate magnet cavity 74 is aligned with the strike plate magnet cavity 86, and each spacer plate attachment bore 90 is aligned with a strike plate attachment bore 92.

To secure the coupled spacer plate 16 and the strike plate 20 to the non-pivotable door 24, the first spacer plate surface 62 is disposed adjacent to and in contact with the non-pivotable door 24, and each spacer plate attachment bore 90 and each strike plate attachment bore 92 are configured to receive one of a plurality of connection features therein, such that the connection features fix the spacer plate 16 and strike plate 20 to each other and further fix the spacer plate 16 and strike plate 20 to the non-pivotable door 24. In one example, the connection features may be one of a bolt or a screw.

As shown in FIGS. 5-6B, the lock assembly 10 may further comprise a locking mechanism 14. The locking mechanism 14 may be a deadbolt lock, and more particularly an electrified deadbolt lock. In an illustrative and non-limiting example, the deadbolt lock may be an electrified deadbolt lock as is commercially available from SCHLAGE® (example models PB405 and PB405S), SDC® (260HV, 2090AU, 1291AHV), as well as other compatible commercially-available examples.

The housing 12 is configured to receive different types and configurations of locking mechanisms 14. Accordingly, the spacer plate 16 is likewise compatible with and configured to receive different types and configurations of locking mechanisms 14 and strike plates 20 associated therewith. The collective use of the spacer plate 16 and housing 12 as detailed herein allows for a variety of different makes, models, and configurations of locking mechanisms 14 to be adaptable to or utilized with existing and/or previously installed and operating non-pivotable door systems. For example, a traditional deadbolt lock alone, without the use of the housing 12 and spacer plate 16, would likely be incompatible with many existing non-pivotable doors 24, as the deadbolt lock alone would require that the same is inserted into the door itself and has an associated keeper device and strike plate 20 disposed within the fixed substrate 17. The housing 12 further provides the advantage of securing the locking mechanism 14 from potential tampering and further protects any associated electronics and/or electrical wiring 99 from the environment and/or surroundings.

In an illustrative example wherein the locking mechanism 14 is an electrified deadbolt lock, the locking mechanism 14 may include a latch bolt 94, a deadbolt hub 96, a faceplate 98, and a proximity sensor 95. The latch bolt 94 may be a cylindrical bolt comprised of a metallic material. The latch bolt 94 may have a diameter of greater than 0.5 inches. Further, the latch bolt 94 may have a first bolt end 81 and a second bolt end 83.

The locking mechanism 14 may further include a deadbolt hub 96 that defines a hub void space 47 therein, wherein the deadbolt hub 96 is configured to retain the latch bolt 94 within the hub void space 47. The deadbolt hub 96 is configured to be inserted into and contained in the housing 12 interior void space 40.

The faceplate 98 may have a first faceplate side 89 and a second faceplate side 91, and further defines a faceplate aperture 87 therein between the first faceplate side 89 and the second faceplate side 91. The faceplate 98 is configured to enclose the deadbolt hub 96 and the hub void space 47, such that the latch bolt 94 is contained within the deadbolt hub 96 on the first faceplate side 89, and is further seated and/or contained within the faceplate aperture 87.

A proximity sensor 95 may be positioned within the deadbolt hub 96 near the faceplate 98 or within the faceplate 98. The proximity sensor 95 may be operatively connected to a smart switch, wherein the proximity sensor 95 is configured to detect proximity of the magnet 88, disposed within the strike plate magnet cavity 86 and the spacer plate magnet cavity 74 respectively, to the proximity sensor 95.

The latch bolt 94 is moveable between the retracted position 100 and the deployed position 200. The locking mechanism 14 may further comprise an actuator 93 operatively connected to the second bolt end 83 and configured to move the latch bolt 94 between the retracted position 100 and the deployed position 200. The actuator 93 may be operatively connected to an electrical wiring 99 or an electrical connection, wherein the electrical wiring 99 is configured to be electrically connected to each of the actuator 93 and a power source. When proximity of the magnet 88 to the proximity sensor 95 is detected, the proximity sensor 95 activates the smart switch, and allows an electric current to be supplied to the actuator 93 via an electrical wiring 99 or electrical connection. The power source may supply the actuator 93 with about 0.9 Amps at 12 Voltage Direct Current (VDC) and/or 0.45 Amps at 24 VDC via the electrical wiring 99 when the smart switch is activated. At least one of the third plurality of bores 46 is configured to receive and house the electrical wiring 99. In one example, the electrical wiring 99 is routed through the respective bore 46 and out of the housing 12 on one of the first side 32 and the second side 34 along the fixed substrate 17; in such an example, the wiring is covered by a cover plate 45 to reduce the likelihood that the electrical wiring 99 and the lock assembly 10 in total may be tampered with. In another example, the electrical wiring 99 is routed through the respective bore of the third plurality of bores 46 and to the power source which is disposed within the housing 12; in such an example, the electrical wiring 99 is fully contained within the housing 12 to reduce the likelihood that the electrical wiring 99 and the lock assembly 10 in total may be tampered with.

Figure 6A:
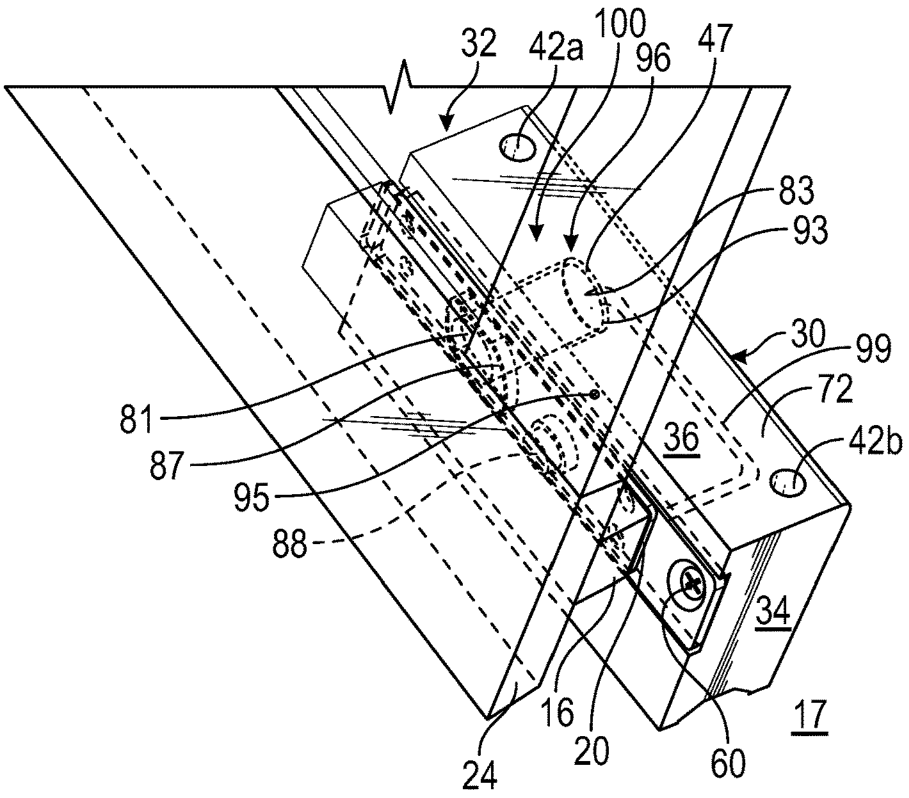
FIG. 6A is a partial schematic perspective view of an example lock assembly employed on a sliding door, wherein the door is in an open position, such that the door is at least partially ajar, and the latch bolt is in the retracted position.
Figure 6B:
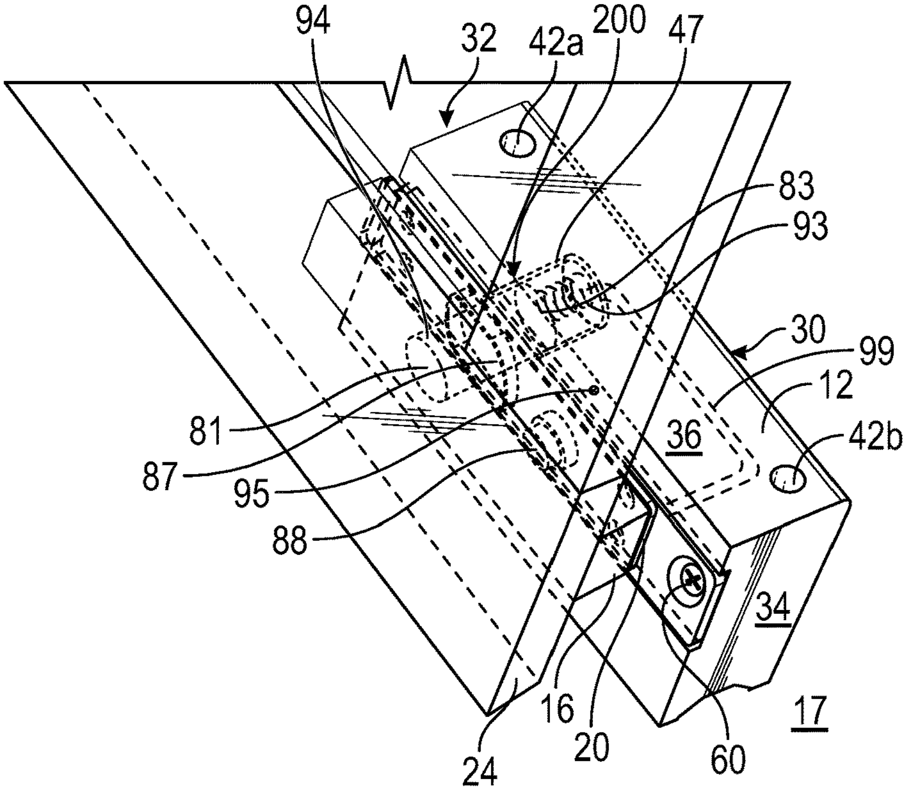
FIG. 6B is a partial schematic perspective view of an example lock assembly employed on a sliding door, wherein the door is in a closed position, and the latch bolt is in the deployed position, such that the door is secured or locked via the locking assembly.

As shown in FIG. 6A, when the latch bolt 94 is positioned in the retracted position 100 the latch bolt 94 is seated within the faceplate aperture 87. When the latch bolt 94 is seated within the faceplate aperture 87, the first bolt end 81 is aligned with the second faceplate side 91 and the second bolt end 83 is within the deadbolt hub 96. The latch bolt 94 is configured to occupy the retracted position 100 in a failsafe mode and in an unlocked mode. In this instance, the smart switch remains deactivated, as the magnet 88 has not achieved proximity to the proximity sensor 95, and no electrical current is supplied to the actuator 93 from the power source via the electrical wiring 99. Accordingly, the latch bolt 94 remains in the retracted position 100 or failsafe position.

When the proximity sensor 95 detects proximity of the magnet 88, as the door 24 approaches a closed position, the proximity sensor 95 activates the smart switch, and allows electric current to be supplied from the power source to the actuator 93 via the electrical wiring 99, such that latch bolt 94 is actuated from the retracted position 100 to the deployed position 200.

Said another way, while an electric current is supplied to the actuator 93, if the proximity sensor 95 detects proximity of the magnet 88, the smart switch is activated such that the actuator 93 moves the latch bolt 94 from the retracted position 100 to the deployed position 200. In the deployed position 200, the latch bolt 94 extends outwardly through the faceplate aperture 87 and into each of the spacer plate bolt void 18 and the strike plate bolt void 22, thereby locking the non-pivotable door 24 to the housing 12. The latch bolt 94 may extend from the faceplate 98 into the spacer plate bolt void 18 and the strike plate bolt void 22 by a throw length of from about 0.6 inches to about 0.7 inches.

When the non-pivotable door 24 is locked to the housing 12 via the locking mechanism 14, and the latch bolt is in the deployed position 200, the non-pivotable door 24 may be selectively unlocked by eliminating the electrical current supplied to the actuator 93 from the power source via the electrical wiring 99. In one example, the locking mechanism 14 may be operable on a key card system, such that when a user swipes a key card, the electrical current supplied to the actuator 93 from the power source via the electrical wiring 99 is dropped or discontinued. When the electrical current is dropped to the locking mechanism 14, the actuator 93 actuates the latch bolt 94 from the deployed position 200 to the retracted position 100 allowing the non-pivotable door 24 to open.

In the key card system example, when a key card is swiped the electrical current is dropped to the actuator 93 in a time increment of from about 3.0 seconds to about 9.0 seconds, thereby allowing the non-pivotable door 24 to open for the specified time increment and/or to allow the user to pass through the port of ingress and egress. Upon the expiration of the time increment, the electrical current from the power source to the actuator 93 will be restored, and the non-pivotable door 24 will return to a closed position, such that the proximity sensor 95 will detect the proximity of the magnet 88, and thereby actuate smart switch, such that the actuator 93 moves the latch bolt 94 from the retracted position 100 to the deployed position 200, so the non-pivotable door 24 is once again locked to the housing 12.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Benefits, other advantages, and solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claims.

The invention claimed is:

1. A housing for a locking mechanism comprising:

a first face, a second face, a first side, a second side, and a housing interior positioned therebetween, wherein the housing defines:

an interior void space defined by a first lateral end, a second lateral end, and a rear wall, wherein the interior void space extends laterally between the first lateral end and the second lateral end and further extends into the housing interior from the first face to the rear wall; and a first plurality of bores wherein each bore is configured to receive a fastening feature that secures the housing to a fixed substrate;

wherein the locking mechanism is an electrified deadbolt lock and wherein the housing is configured to receive the electrified deadbolt lock within the interior void space, the electrified deadbolt lock comprising:

a latch bolt with a first bolt end and a second bolt end, wherein the latch bolt is moveable between a retracted position and a deployed position;

a deadbolt hub that defines a hub void space therein, wherein the deadbolt hub is configured to retain the latch bolt within the hub void space; and a deadbolt faceplate defined by a first faceplate side and a second faceplate side and defining a faceplate aperture therein between the first faceplate side and the second faceplate side, wherein the deadbolt faceplate is configured to enclose the hub void space, such that the latch bolt is contained within the faceplate aperture and the hub void space;

wherein in the deployed position the latch bolt extends outwardly through the faceplate aperture, such that the first bolt end is positioned on the second faceplate side; and wherein in the retracted position the latch bolt is seated within the faceplate aperture, such that the first bolt end is aligned with the second faceplate side.

2. The housing of claim 1 wherein the first plurality of bores comprises at least a first bore positioned laterally between the first side and the first lateral end and a second bore positioned laterally between the second lateral end and the second side, wherein each of the first bore and the second bore are positioned longitudinally between the rear wall and the second face.

3. The housing of claim 2 further defining:

a third face laterally positioned between the first side and the first lateral end and longitudinally positioned between the first face and the rear wall of the interior void space; and a fourth face laterally positioned between the second side and the second lateral end and longitudinally positioned between the first face and the rear wall of the interior void space;

wherein the third face and the fourth face are laterally spaced apart by the interior void space.

4. The housing of claim 3 further defining a second plurality of bores positioned on the third face and the fourth face and extending into the housing interior toward the second face, wherein each bore of the second plurality of bores is configured to receive a securing feature that secures the locking mechanism to the housing.

5. The housing of claim 3 wherein the housing comprises a plurality of discrete portions.

6. The housing of claim 5 wherein the plurality of discrete portions comprises a first portion defining at least the first face; and a second portion defining at least the second face and the housing interior.

7. The housing of claim 6 wherein the plurality of discrete portions further comprises a third portion defining at least the first side and the third face.

8. The housing of claim 7 wherein the plurality of discrete portions further comprises a fourth portion defining at least the second side and the fourth face.

9. The housing of claim 8 further defining a third plurality of bores that extend between the interior void space and the fixed substrate, wherein:

the electrified deadbolt lock further comprises an actuator configured to move the latch bolt between the retracted position and the deployed position, and an electrical wiring configured to be electrically connected to each of the actuator and a power source, such that when an electric current is supplied from the power source to the actuator via the electrical wiring, the latch bolt is moved from the retracted position to the deployed position; and at least one of the third plurality of bores is configured to receive the electrical wiring.

10. A locking assembly for a non-pivotable door, the locking assembly comprising:

a housing comprising a first face, a second face, a first side, a second side, and a housing interior positioned therebetween, wherein the housing defines:

an interior void space defined by a first lateral end, a second lateral end, and a rear wall wherein the interior void space extends laterally between the first lateral end and the second lateral end and further extends into the housing interior from the first face to the rear wall;

a first plurality of bores wherein each bore is configured to receive a fastening feature that fastens the housing to a fixed substrate; and a spacer plate defined by a first spacer plate surface, a second spacer plate surface, a first lateral spacer plate side, a second lateral spacer plate side, and a predetermined spacer plate thickness between the first spacer plate surface and the second spacer plate surface, the spacer plate further defining:

a spacer plate bolt void that extends through an entirety of the predetermined spacer plate thickness between the first spacer plate surface and the second spacer plate surface; and a spacer plate magnet cavity that extends through the entirety of the predetermined spacer plate thickness between the first spacer plate surface and the second spacer plate surface and is disposed between the spacer plate bolt void and the first lateral spacer plate side; and a locking mechanism configured to be contained within the interior void space of the housing.

11. The locking assembly of claim 10 further comprising a strike plate defined by a first lateral strike plate side, a second lateral strike plate side, first strike plate surface, a second strike plate surface, and a predetermined strike plate thickness between the first strike plate surface and the second strike plate surface, the strike plate further comprising:

a strike plate bolt void that extends through an entirety of the predetermined strike plate thickness between the first strike plate surface and the second strike plate surface; and a strike plate magnet cavity that extends through the entirety of the predetermined strike plate thickness between the first strike plate surface and the second strike plate surface, and is disposed between the first lateral strike plate side and the strike plate bolt void.

12. The locking assembly of claim 11 further comprising a magnet disposed within each of the spacer plate magnet cavity and the strike plate magnet cavity.

13. The locking assembly of claim 12 wherein the spacer plate further defines a plurality of spacer plate attachment bores that extend through the entirety of the predetermined spacer plate thickness between the first spacer plate surface and the second spacer plate surface, wherein at least one spacer plate attachment bore is disposed between the first lateral spacer plate side and the spacer plate magnet cavity, and wherein at least one spacer plate attachment bore is disposed between the second lateral spacer plate side and the spacer plate bolt void.

14. The locking assembly of claim 13 wherein the strike plate further defines a plurality of strike plate attachment bores that extend through the entirety of the predetermined strike plate thickness between the first strike plate surface and the second strike plate surface, wherein at least one strike plate attachment bore is disposed between the first lateral strike plate side and the strike plate magnet cavity, and wherein at least one strike plate attachment bore is disposed between the second lateral strike plate side and the strike plate bolt void.

15. The locking assembly of claim 14 further comprising a plurality of connection features configured to couple the spacer plate to the strike plate and further couple the spacer plate and the strike plate to the non-pivotable door, wherein:

the first spacer plate surface is disposed adjacent to and in contact with the non-pivotable door;

the first strike plate surface is disposed adjacent to and in contact with the second spacer plate surface, such that the spacer plate bolt void is aligned with the strike plate bolt void and the spacer plate magnet cavity is aligned with the strike plate magnet cavity;

each spacer plate attachment bore is aligned with a strike plate attachment bore; and each spacer plate attachment bore and each strike plate attachment bore are configured to receive one of the connection features therein, such that the connection features fix the spacer plate and strike plate to each other and further fix the spacer plate and strike plate to the non-pivotable door.

16. The locking assembly of claim 15 wherein the locking mechanism is an electrified deadbolt lock comprising:

a latch bolt with a first bolt end and a second bolt end, wherein the latch bolt is moveable between a retracted position and a deployed position;

an actuator operatively connected to the second bolt end, the actuator configured to move the latch bolt between the retracted position and the deployed position;

a deadbolt hub that defines a hub void space therein, wherein the deadbolt hub is configured to retain the latch bolt and the actuator within the hub void space; and an electrical wiring configured to be electrically connected to each of the actuator and a power source.

17. The locking assembly of claim 16 wherein the housing further defines a third plurality of bores that extend between the interior void space and the fixed substrate; and wherein at least one of the third plurality of bores is configured to receive the electrical wiring.

18. The locking assembly of claim 15 wherein the locking mechanism further comprises a proximity sensor operatively connected to a smart switch;

wherein the proximity sensor is configured to detect proximity of the magnet to the proximity sensor; and wherein when an electric current is supplied from the power source to the actuator via the electrical wiring, and the proximity sensor detects proximity of the magnet to the proximity sensor, the actuator moves the latch bolt from the retracted position to the deployed position.

19. The locking assembly of claim 18 wherein the first plurality of bores comprises at least a first bore positioned laterally between the first side and the first lateral end and a second bore positioned laterally between the second lateral end and the second side, wherein each of the first bore and the second bore are positioned longitudinally between the rear wall and the second face; and wherein the locking assembly further defines:

a third face laterally positioned between the first side and the first lateral end and longitudinally positioned between the first face and the rear wall of the interior void space;

a fourth face laterally positioned between the second side and the second lateral end and longitudinally positioned between the first face and the rear wall of the interior void space; wherein the third face and the fourth face are laterally spaced apart by the interior void space; and a second plurality of bores positioned on the third face and the fourth face and extending into the housing interior toward the second face, wherein each bore of the second plurality of bores is configured to receive a securing feature that secures the locking mechanism to the housing and within the interior void space.

* * * * *